UNITED STATES PATENT OFFICE 2,347,494

N-SUBSTITUTED AMIDE AND METHOD FOR PREPARING THE SAME

Frederick Madison Meigs, Wilmington, Del., assignor to E. I. du Pont de Nemours & Company, Wilmington, Del., a corporation of Delaware No Drawing. Application December 31, 1941, Serial No. 425,123

6 Claims. (Cl. 260—561)

This invention relates to N-substituted amides, and particularly to a method for preparing N-substituted derivatives of hydroxyacetamide having at least one alkoxy or hydroxy group on the N-substituent.

It is an object of this invention to produce new chemical compounds. A further and more specific object is to prepare new derivatives of N-substituted acetamide having at least two oxy groups, one of which is linked to the alpha carbon atom and the other to the N-substituent. Other objects will be apparent as the description proceeds.

According to this invention, a chemical compound of the formula

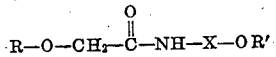

wherein R is hydrogen or an aliphatic radical (including alkoxyalkyl radicals), R' is hydrogen or an aliphatic radical (including alkoxyalkyl radicals), and X is a divalent hydrocarbon radical of at least 2 carbon atoms, can be prepared by reacting an aliphatic ester of the formula

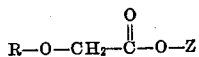

with an amine of the formula $NH_2-X-OR'$, wherein R, X, and R' have the significance above designated, and Z is an aliphatic radical of the alcohol Z—OH. The compounds of this invention are thus seen to contain the nucleus corresponding to the N-substituted amide of hydroxyacetic acid wherein the N-substituent is also hydroxylated, and in which the hydroxy groups may be further substituted, as by alkoxyalkyl groups.

In the above generic reaction, the amino-compound displaces the alcohol, Z—OH, which can then be removed from the reaction mixture by known means. In the preferred case where Z is a methyl group, the chemical reaction involved is a simple aminolysis of a methyl ester, wherein the amine replaces the O—CH₃ group, liberating methanol. The reaction is preferably carried out in a closed vessel provided with means for applying a vacuum thereto, a stirrer, a reflux condenser, and an inlet tube dipping below the surface of the liquid. The amine is admixed with the ester, and a vigorous exothermic reaction usually takes place. In some cases, heating the reactants may be desirable, as is more fully explained hereinafter. After reaction is completed, the methanol is removed from the mixture, preferably by vacuum distillation which also removes any remaining traces of unreacted ester and amine. In the final stages of methanol removal, an inert gas such as nitrogen may be passed through the reaction mixture to facilitate unreacted ester removal.

Alkyl esters of hydroxyacetic acid are the preferred esters for reaction in accordance with this invention; but an organic substituent may also be present upon the alpha-oxygen atom of these esters; that is, an organic radical such as alkoxyalkyl, may replace the hydrogen of the alpha hydroxy group. Alkyl esters of the following acids may be used: methoxyacetic, ethoxyacetic, methoxymethoxyacetic, methoxyethoxyacetic, propoxyacetic, phenoxyacetic, cyclohexyloxyacetic, and in fact any acid of the hydroxyacetic residue, including diglycollic acid. Although the methyl esters are preferred, ethyl, propyl and other alkyl esters of the foregoing acids may likewise be employed.

Any primary or secondary alkylolamine having at least two carbon atoms between the amino group and the alcohol group and having at least one hydrogen atom bonded to the amino nitrogen atom may be used in this invention. Furthermore, the hydroxy hydrogen atom in the alkylolamine may be replaced by other organic radicals, for example, as in mono- and di-methoxyethylamine, ethoxyethylamine, and phenoxyethylamine.

Mono-ethanolamine is the preferred alkylol amine for reaction in accordance with this invention. It is, however, representative of numerous other alkylol amines which may be utilized, such as diethanol amine, the mono- and dipropanol amines, isobutoxymethoxyethyl amine, the primary and secondary amines of di- tri- and polyethylene glycols, as well as of the corresponding propylene and butylene glycols, 1-amino-6-hydroxy hexane, and glucamine.

In carrying out the reaction of the ester with the aminoalcohol, it is preferred to employ approximately equal molar proportions of each reactant, since one mole of ester combines with one mole of aminoalcohol. However, the ratio of reactants may be varied widely within the scope of the invention, the result of such variation being that the reactant present in less than about the stoichiometric ratio is completely reacted, while some of the reactant present in greater than about stoichiometric proportions remains to be separated from the product. In this connection, a slight excess of ester over aminoalcohol is preferred to an excess of amino alcohol over ester, since it is generally easier to secure a complete separation, by distillation, of ester from the N-substituted amide produced, than to separate unreacted aminoalcohol therefrom.

The reaction of an aminoalcohol with a hydroxyacetic ester to produce an N-substituted hydroxyacetamide is exothermic, and ordinarily requires no heating. However, to insure complete reaction, it may be desirable to heat the reaction mixture to initiate reaction in some cases, and to complete amidification after subsidence of the autogenous phase of the reaction.

In general, the reaction is initiated by merely admixing hydroxyacetic or alkoxyacetic ester with aminoalcohol. In order to prevent loss of reactants by vaporization, it is desirable to carry out the amidation in a closed reaction vessel provided with a reflux condenser for returning volatilized ester and aminoalcohol to reaction. After the amidation is completed, the reflux condenser is replaced by an ordinary condenser, and the alcohol liberated from the ester is distilled off.

The temperature of reaction is at least as high as the boiling point of the alcohol liberated, but below that at which substantial decomposition of the formed N-substituted hydroxyacetamide occurs. In general, a temperature of at least 66° C. is preferred, and usually not higher than 225° C.

The following examples, in which parts are by weight unless otherwise designated, serve to illustrate the practice of the invention, without however limiting it:

*Example 1.*—1420 parts (15.8 mols) of methyl hydroxyacetate is placed in a vessel provided with a stirring mechanism, reflux condenser, and inlet tube dipping below the surface of the liquid. Stirring is commenced and over a period of one hour 915 parts (15.0 mols) of ethanol amine is added through the inlet tube. An exothermic reaction takes place, causing the methanol to reflux in the condenser. The mixture is allowed to cool to 20° C. while stirring, and the resultant crop of ethanol-hydroxyacetamide crystals is filtered off and washed with cold methanol. The filtrate and washings are combined and concentrated under vacuum to about one-third of their original volume. On further cooling, the second crop of ethanolhydroxyacetamide crystals is obtained, which is filtered and washed as before. The combined crops of crystals, equalling 1512 parts, represent a yield of 85% based on ethanol amine.

The product prepared above is an odorless, white, crystalline solid, ethanol hydroxyacetamide, [N-(beta-hydroxyethyl)hydroxyacetamide], of the formula $CH_2OHCONHCH_2CH_2OH$, and has a molecular weight of 119.12, a melting point of 71–72° C., a density of 1.3 and it decomposes above 225° C. at atmospheric pressure. The pH of a 10% aqueous solution at 25° C., is 6.3, and the product is soluble in water, glycol, glycerol, methanol, and ethanol. It is moderately soluble in acetone, and dioxane; slightly soluble in diethyl ether and ethyl acetate; insoluble in hydrocarbons, higher esters, and higher ketones.

*Example 2.*—61 parts of ethanol amine is reacted with 114 parts of methyl methoxyacetate as in the preceding example. An exothermic reaction takes place and after removal of methanol and a small amount of unreacted ester under vacuum, the product, N-ethanol methoxyacetamide, is obtained in high yield.

*Example 3.*—To 854.5 parts of (isobutoxymethoxy) ethylamine, $NH_2CH_2CH_2OCH_2OC_4H_9$, are added slowly with stirring 675 parts of methyl hydroxyacetate. After standing for two hours, methanol is stripped from the reaction mixture under reduced pressure. Excess methyl hydroxyacetate is removed while heating on a water bath at 2 mm. pressure. 1189 parts of colorless, crystalline, N-(β-(isobutoxymethoxy) ethyl) hydroxyacetamide is obtained, which on crystallization from ethyl ether, melts at 41–42.5° C. It is soluble in water, benzene and methanol. Nitrogen analysis: calculated for $C_9H_{19}O_4N$, 6.83%; found 6.81%.

*Example 4.*—With agitation, 243 parts of methyl diglycolate is added slowly to 183 parts of ethanolamine. Considerable heat is evolved, causing the temperature of the reaction mixture to rise above 65° C. After the reaction subsides, the mixture is heated on the steam bath for several hours. Addition of ethyl ether to a methanol solution of the product precipitates colorless crystals of bis-(N-β-hydroxyethyl) diglycolamide, $O(CH_2CONHCH_2CH_2OH)_2$, which melt at 102–104° C. Nitrogen analysis: calculated for $C_8H_{16}O_5N_2$ 12.7%; found 13.4%.

In large scale practice of the invention, methanol and any slight amounts of unreacted ester may be distilled off at temperatures in the range of 90–95° C. and at pressures decreasing to 2 mm. Hg. Should any difficulty be experienced in crystallizing the product, this may be remedied by seeding with a few crystals already prepared by extreme cooling of a sample.

The products of this invention are excellent hygroscopic agents and water-soluble plasticizers. They serve to plasticize urea-formaldehyde resins, glue, gelatin, polyvinyl alcohols, and cellulose ethers such as methyl and ethyl cellulose. When the products of this invention contain an unsubstituted hydroxy group upon the N-substituent together with an unsubstituted hydroxyacetamide group, they serve as excellent intermediates for the preparation of ester gum, polyester, and alkyd resins. They are applicable as softeners for films of regenerated cellulose and rubber hydrohalides. Because of water solubility, the lower members of this group are useful as thickeners and dispersing agents, as well as humectants in the paper and tobacco industries.

Although the invention has been described in some detail, it is not limited to the specific details and methods shown and described, since many variations within the scope and spirit of the invention will be apparent to one skilled in the art.

What is claimed is:

1. N-(β-hydroxyethyl) hydroxyacetamide.

2. The process which comprises subjecting an approximately equimolar mixture of methyl hydroxyacetate and monoethanolamine to reaction at a temperature at least as high as the boiling point of methanol but below 225° C., and separating N-(β-hydroxyethyl) hydroxyacetamide from the reaction mixture by cooling and crystallization.

3. The process which comprises admixing about 1420 parts by weight of methyl hydroxyacetate with about 915 parts by weight of ethanolamine, agitating the reaction mixture for about one hour, then cooling to about 20° C. and separating the formed N-(β-hydroxyethyl) hydroxyacetamide by crystallization.

4. In the process of preparing an N-alkylol hydroxyacetamide, the steps which comprise subjecting an alkyl ester of hydroxyacetic acid in which the carboxy group is esterified, to reaction at a temperature of 66° C. to 225° C. with an alkylolamine containing an amino hydrogen atom and separating the formed N-alkylol hydroxyacetamide by crystallization.

5. Compounds of the formula $$ROCH_2CONHCH_2CH_2OR'$$

wherein R is selected from the group of hydrogen and alkyl radicals and R¹ is selected from the group of hydrogen and alkoxyalkyl radicals.

6. N-(β-(isobutoxymethoxy)ethyl) hydroxyacetamide.

FREDERICK M. MEIGS.